Nov. 18, 1941.   R. SIMMON   2,262,972
PHOTOGRAPHIC ENLARGER
Filed Jan. 31, 1941   2 Sheets-Sheet 1

INVENTOR:
Rudolph Simmon
BY
Walter E. Wollheim

Nov. 18, 1941.   R. SIMMON   2,262,972
PHOTOGRAPHIC ENLARGER
Filed Jan. 31, 1941   2 Sheets-Sheet 2
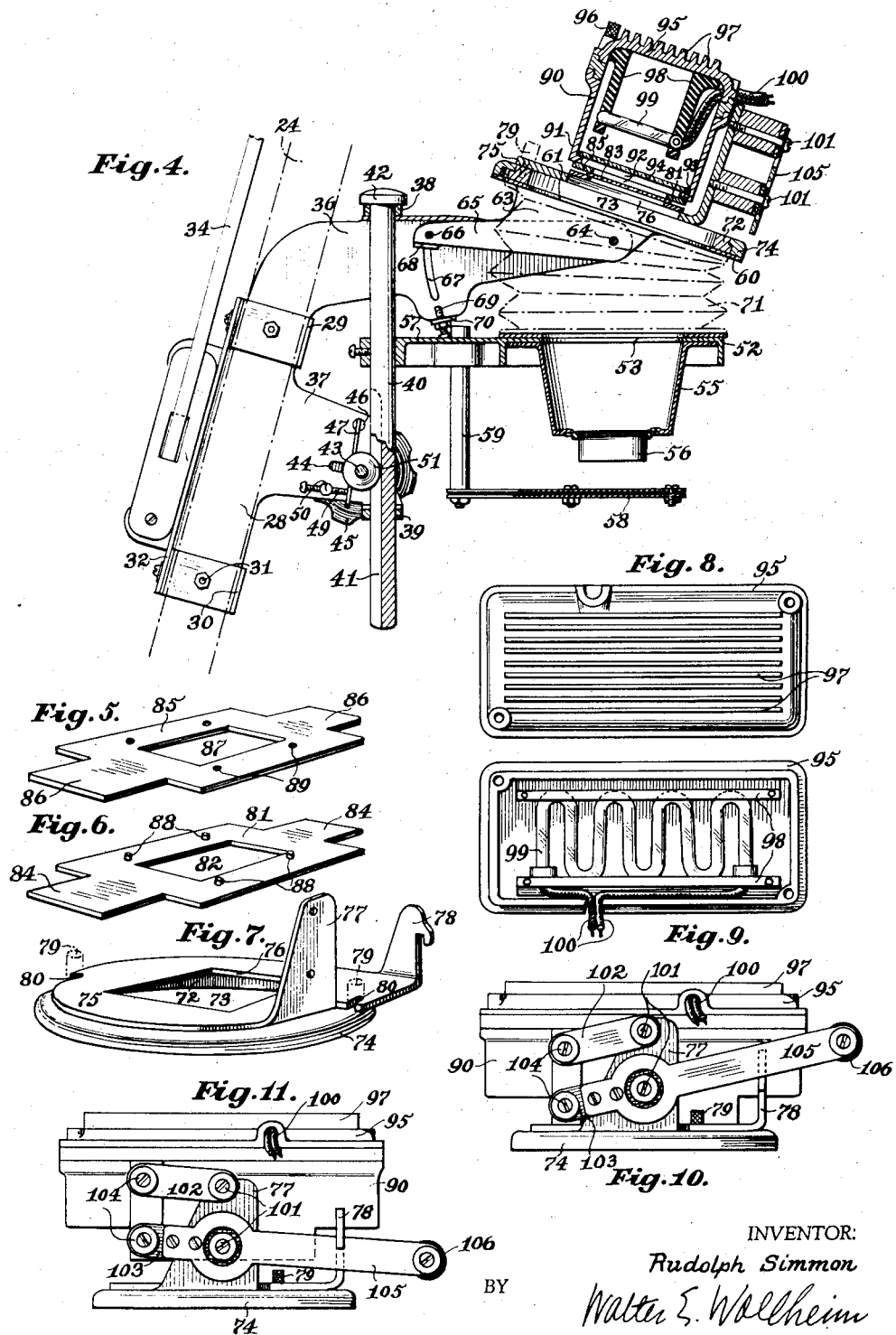
INVENTOR:
Rudolph Simmon
BY Walter E. Wollheim Patented Nov. 18, 1941

2,262,972

UNITED STATES PATENT OFFICE 2,262,972

PHOTOGRAPHIC ENLARGER

Rudolph Simmon, Jackson Heights, N. Y., assignor to Simmon Brothers Inc., Long Island City, N. Y., a corporation of New York Application January 31, 1941, Serial No. 376,823

17 Claims. (Cl. 88—24)

The usual type of photographic enlarger comprises a light source, a negative holder, and a lens, all mounted upon a carriage adjustably secured to a support. In order to correct distortion in the negative with these enlargers it was necessary to tilt the negative and, generally proportionately, the easel upon which the sensitized paper was placed, this method being described in Patent #2,239,760 issued to me on April 29, 1941, and improved upon as disclosed in Patent #2,222,185 issued to me on November 19, 1940. In such enlargers the source of light was stationary with respect to the carriage, and to tilt the negative required this source of light to be as large as a circle described around the negative for effective illumination.

It is the principal object of this invention to provide in enlargers of photographic negatives, a lamp housing containing a source of light which can be rotated and tilted with the negative and its holder so that the area to be illuminated needs only be as large as the negative itself.

Another object is to adapt such a lamp housing to the reception of a gaseous conductor or fluorescent lamp as described in co-pending applications Serial #357,568 and Serial #370,169 by Alfred Simmon and duly assigned to Simmon Brothers, Inc.

A further object is to provide in a photographic enlarger light of sufficient intensity whereby the usual condenser lenses may be omitted.

Other objects will become apparent in the following specification and the accompanying drawings in which a preferred embodiment of the invention is described and shown.

In the drawings:

Fig. 4 is an enlarged side view partly in section of the carriage and a fragmentary part of its support, essentially along the plane of line 4—4 in Fig. 2, with the lamp housing and negative holder in a tilted position for distortion control;

Figs. 5 and 6 are perspective views of, respectively, the top and bottom plates of a negative holder;

Fig. 7 is a perspective view of a negative holder support;

Fig. 8 is a plan view of the lamp housing;

Fig. 9 is a bottom view of the cover of the lamp housing showing the light source attached to it;

Fig. 10 is a front elevational view of the lamp housing in a position clamping the negative holder upon its support;

Fig. 11 is a front elevational view of the lamp housing when lifted off the negative holder.

Like characters of reference denote similar parts throughout the several views and the following specification.

Figure 1:
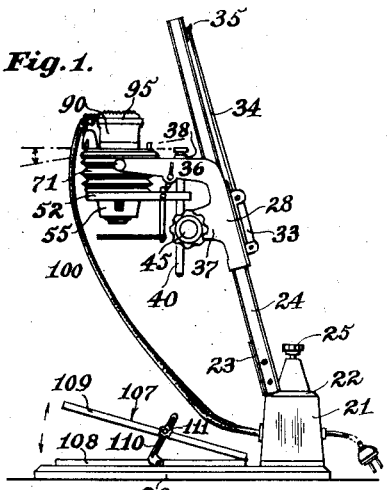
Fig. 1 is a side elevational view of an enlarger embodying the principles of my invention.
Figure 2:
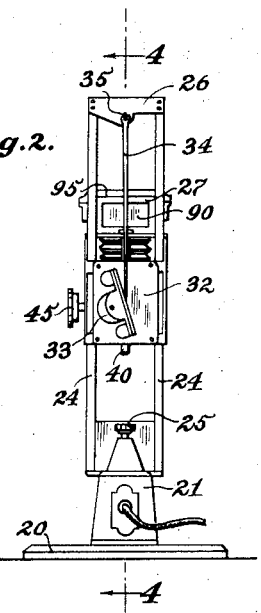
Fig. 2 is a rear view of the same.
Figure 3:
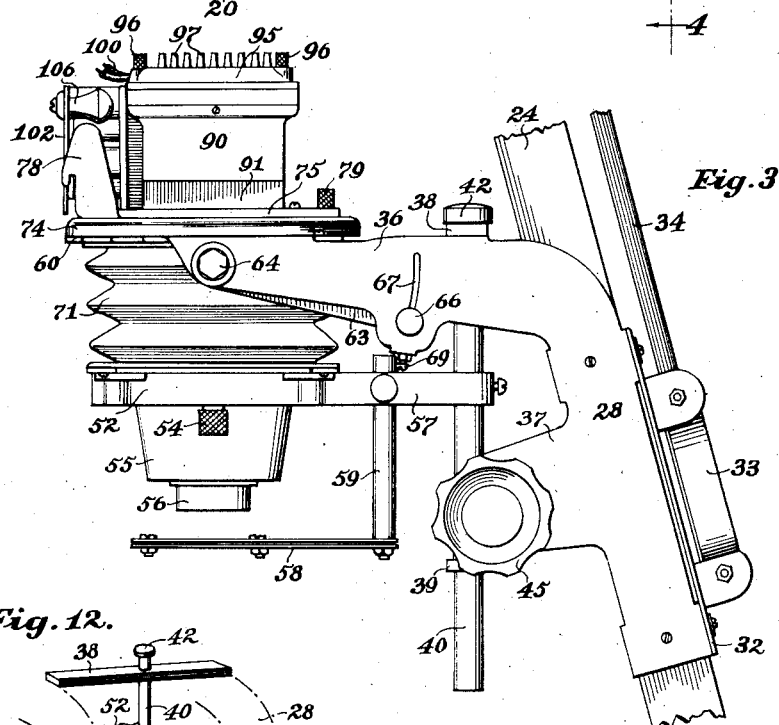
Fig. 3 is an enlarged side view of the movable carriage or head of the enlarger and a fragmentary portion of its support.

20 is a baseboard at one extremity of which is located a pedestal 21 having rotatably fastened upon it a turntable 22 with upturned lugs 23, to each of which girders 24 of substantially U cross sections are secured. A lock screw 25 fastens the turntable 22 in any desired position. Girders 24 are inclined forwardly over the baseboard and have their tops connected by a stringer piece 26. Additional cross pieces 27 are provided between the girders to give the structure further rigidity. It is obvious that the entire girder assembly can be swiveled upon the pedestal 21 by rotating the turntable 22.

28 are frame members of a focusing carriage at both open sides of the U-shaped girders 24 having projections 29 and 30 at right angles guiding the frame members 28 upon the legs of the U-shaped girders 24. Fiber sheets or other friction reducing material is interposed between the projections 29 and 30 and the girders 24, and secured to the frame members 28 by screws 31.

Fastened to the projections 29 and 30 at the back of the girders 24 is a plate 32 having mounted thereon a housing 33 within which is coiled, and fastened upon a suitable shaft, a steel spring tape 34, one free end of which projects through a slot in the wall of the housing and is fastened to a hook-like projection 35 on the stringer piece 26 at the top of the girders providing a counter balance for the focusing carriage.

The frame members 28 of the carriage have at their tops each a forwardly extending bracket 36 and nearer their bottoms another somewhat shorter bracket 37. 38 is a plate across the tops of brackets 36, and 39 is a similar plate, in vertical alignment with plate 38, across the bottoms of brackets 37.

Slidably supported within plates 38 and 39 is a vertically disposed focusing rod 40 having a groove 41 at its back throughout the greater part of its length. 42 is a stop collar secured to the top of the focusing rod 40.

Figure 12:
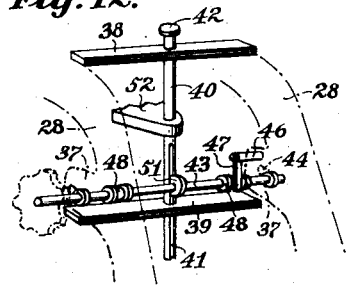
Fig. 12 is a fragmentary perspective view of details of the focusing adjustment.

A transversely disposed focusing shaft 43 is journaled within oblong holes 44 of brackets 37 of frame members 28, as shown in Fig. 12 in which parts of members 28 only are shown in dotted lines, for sake of clearness. One end of the shaft projects beyond one of the brackets 37 and is provided with a hand wheel 45. From studs 46 in opposed inner faces of brackets 37 leaf springs 47 are suspended which are forced against collars 48 in shaft 43 by adjusting screws 49 in other studs 50 for the purpose of having a wheel 51, keyed to the shaft 43, frictionally engage the bottom of groove 41 in focusing rod 40. By turning hand wheel 45, focusing rod 40 is either raised or lowered for focusing purposes by the friction exerted by the wheel 51 against it, respectively, its groove 41.

52 is a support of circular shape having a central circular opening 53 below which is fastened by screws 54 a flanged tubular lens carrier 55 with its lens 56. Support 52 has a rearward extension 57 which is bored out to fit over the focusing rod 40 to which it is securely fastened so as to move with it.

58 is a red filter suspended from a small vertical shaft 59 adjustably fastened within extension 57 of the support 52 at the bottom thereof, the filter being adapted to be swung about shaft 59 to a position concentric with the lens.

60 is an adjusting plate having a circular central aperture 61, and downwardly extending lugs 63 which are pivotally supported by screws 64 at the inside of the extreme forward ends of brackets 36 of frame members 28. At one side, lug 63 is extended rearwardly to form a leg 65, at the end of which a set screw 66 is fastened. An arcuate slot 67, having screw 64 as its center, is provided for in that bracket 36 which is adjacent to leg 65. The set screw 66 projects through the slot 67 and has a shoulder adapted to lock the leg 65, and thus the plate 60, in any position which the travel of the screws within the slot permits. Immediately below the set screw where it is screwed into leg 65, the leg is bent over at right angles at 68 to provide a stop for an adjusting screw 69 in a similar projection 70 from the bottom of bracket 36. In a perfectly horizontal position, the stop 68 of leg 65 comes to a stop at the end of the adjusting screw 69 in the bracket 36. The adjusting feature of the screw is necessary to permit perfect levelling in such a position. 71 are bellows between the bottom of adjusting plate 60 and the top of support 52. 72 is a rotatable support having a central aperture 73 and a flange 74 to fasten it upon the top of adjusting plate 60.

75 is a circular plate having a rectangular aperture 76, and upturned bracket 77 and an upturned latch plate 78. Set screws 79 projecting through grooves 80 at the outside of the plate fasten the plate 75 removably upon the rotatable support 72.

Resting upon circular plate 75, is the bottom plate 81 of a film or negative holder having an opening 82 to correspond to the size of the picture upon a film 83. 84 are lateral projections from the plate to facilitate its handling. 85 is a top plate of the film holder having lateral projections 86 and an aperture 87 to correspond with the projections and aperture of the bottom plate 81. Dowels 88 in the bottom plate guide the film and engage holes 89 in the top plate to bring both apertures 82 and 87 in register.

90 is a substantially rectangular lamp housing having a lower extension 91 with a rectangular opening 92. On inwardly extending flanges 93 around the opening 92 rests a diffusion plate 94, held there by screws or other suitable means. A cover 95 for the open top of the housing 90 is fastened to it by screws 96 and is provided, preferably, with air cooling fins 97. A support 98 of fiber or other similar insulating material is fastened by suitable means to the under-side of cover 95 and carries a source of light, preferably, as shown, a grid 99 of gaseous conductors or fluorescent lamps. 100 are wires connecting the terminals of the grid to a suitable transformer within the pedestal 21 upon the baseboard 20 which also contains suitable switching mechanism and carries the usual type of socket for plugging the apparatus into an electric power circuit.

Pivotally fitted with one of their ends upon screw studs 101 on the outside of bracket 77 of plate 75 are two levers 102 and 103, one above the other and both substantially parallel to each other. The other ends of the levers 102 and 103 are pivotally fastened to the outside of the lamp housing 90 by studs 104. Studs 101 are in approximately the center of the outside of the lamp housing. Fastened to the lower lever 102 is a spring handle 105 forming substantially an extension of the lever. The end of the handle is provided with a knob 106. In the normal or closed position the handle 105, being made of spring material, rides on the outside of latch plate 78 when it clamps the negative holder together. If it is desired to change the film or separate the negative holder, the handle 105 is pressed downwardly which raises the lamp housing by virtue of the oscillation of levers 102 and 103 about studs 101 until the handle snaps into the groove of the latch plate 78. In this position the lamp housing remains raised and access to the negative holder can conveniently be had. The low and high positions of the lamp housing are clearly shown in Figs. 10 and 11.

107 is an easel resting upon the baseboard 20. It consists of a bottom plate 108 having hinged thereto a top plate 109. A slotted lever 110 is pivotally connected to the bottom plate 108. A lock screw 111 fastened to the top plate 109 travels within the slot in the lever 110 and serves to lock the top plate which forms the paper support in any desired angular position with respect to the bottom plate.

In order to rectify distorted negatives as for instance to change converging lines in a negative to parallel ones, I raise the top plate of the easel upon which the sensitized paper is placed to an angle in which an imaginary center line through the negative appears quite sharp. Then I tilt the entire lamp housing with the negative holder to an opposite angle in which the entire area of the picture projected upon the paper becomes sharp, and the diverging lines parallel. In this connection a large angle of the easel requires a large angle of tilt for the negative holder, but for the same negative this angle will become smaller for larger magnifications and vice versa. The negative holder with the lamp housing may be rotated in order to bring desired lines in the image parallel to its margin, or to compose the picture better within it.

By providing a fluorescent lamp within the housing and owing to the greater proximity of the light to the negative in its various positions, I am able to eliminate condenser lenses in the lamp housing. However, I want it to be understood, that I can apply the same movement of the lamp housing, with its tilting and rotating characteristics, to a housing containing the more conventional incandescent bulb and condenser lenses, or with reflective mirrors behind the bulb.

It is apparent that while I have shown no particular means for holding the carriage as a unit in a selected position upon the girders and depend upon friction only to maintain it in such a position, locking means well known in the art and as for instance disclosed in my aforesaid Patent #2,239,760 may be employed. Moreover, the adjusting means for the tiltable lamp housing which are shown on one side only may, of course, be duplicated on the other side. Where I have made references to frame members in the appended claims, this term is to be interpreted broadly as sides of the carriage and should not be restricted to the particular structure shown. Further, instead of the form of negative holder disclosed, any other conventional means for supporting or holding the negative or film may, of course, be employed.

It is obvious therefore that many changes of form, proportions and minor details of construction may be resorted to without departing from the principles or sacrificing any of the advantages of the invention as defined in the appended claims.

What I claim as new is:

1. A focusing carriage for photographic enlargers having a lamp housing and a support therefor adapted to receive a negative between them, a lens carrier below said support, and means to rotate and tilt said lamp housing and support in unison and independently of said lens carrier.

2. A focusing carriage for photographic enlargers having a lamp housing and a support therefor adapted to receive a negative between them, a lens carrier below said support, means to rotate and tilt said lamp housing and support in unison and independently of said lens carrier, and means to raise and lower said lamp housing with respect to said support.

3. A focusing carriage for photographic enlargers having a lamp housing and a support therefor adapted to receive a negative between them, a lens carrier below said support, means to rotate and tilt said lamp housing and support in unison and independently of said lens carrier, means to raise and lower said lamp housing with respect to said support, and means to maintain said housing in raised position.

4. A focusing carriage for photographic enlargers having a lamp housing and a rotatable support therefor adapted to receive a negative between them, means for tilting said support and means for maintaining said support in selected tilted positions, a lens carrier below said support, and means to rotate and tilt said lamp housing and support in unison and independently of said lens carrier.

5. A focusing carriage for photographic enlargers having a lamp housing and a rotatable support therefor adapted to receive a negative between them, means for tilting said support and means for maintaining said support in selected tilted positions, a lens carrier below said support, means to rotate and tilt said lamp housing and support in unison and independently of said lens carrier, and means to raise and lower said lamp housing with respect to said support.

6. A focusing carriage for photographic enlargers having a lamp housing and a rotatable support therefor adapted to receive a negative between them, means for tilting said support and means for maintaining said support in selected tilted positions, a lens carrier below said support, means to rotate and tilt said lamp housing and support in unison and independently of said lens carrier, means to raise and lower said lamp housing with respect to said support, and means to maintain said housing in raised position.

7. In a photographic enlarger, a support and a movable carriage thereupon, a rotatable apertured plate tiltably mounted upon said carriage, a lens carrier adjustably secured to said carriage below said plate, a lamp housing supported by said plate, and a negative holder between said housing and plate, said plate, negative holder and lamp housing adapted to be rotated and tilted in unison and independently of said lens carrier.

8. In a photographic enlarger, a support and a movable carriage thereupon, a rotatable apertured plate tiltably mounted upon said carriage, a lens carrier adjustably secured to said carriage below said plate, a lamp housing supported by said plate, a negative holder between said housing and plate, said plate, negative holder and lamp housing adapted to be rotated and tilted in unison and independently of said lens carrier, and means to raise and lower said lamp housing with respect to said plate.

9. In a photographic enlarger, a support and a movable carriage thereupon, a rotatable apertured plate mounted upon said carriage, means for tilting said plate and means for maintaining said plate in selected tilted positions, a lens carrier adjustably secured to said carriage below said plate, a lamp housing supported by said plate, and a negative holder between said housing and plate, said plate, negative holder and lamp housing adapted to be rotated and tilted in unison and independently of said lens carrier.

10. In a photographic enlarger, a support and a movable carriage thereupon, a rotatable apertured plate mounted upon said carriage, means for tilting said plate and means for maintaining said plate in selected tilted positions, a lens carrier adjustably secured to said carriage below said plate, a lamp housing supported by said plate, a negative holder between said housing and plate, said plate, negative holder and lamp housing adapted to be rotated and tilted in unison and independently of said lens carrier, and means to raise and lower said lamp housing with respect to said plate.

11. In a photographic enlarger, a support and a movable carriage thereupon, a rotatable apertured plate mounted upon said carriage, means for tilting said plate and means for maintaining said plate in selected tilted positions, a lens carrier adjustably secured to said carriage below said plate, a lamp housing supported by said plate, a negative holder between said housing and plate, said plate, negative holder and lamp housing adapted to be rotated and tilted in unison and independently of said lens carrier, means to raise and lower said lamp housing with respect to said plate, and means to maintain said housing in raised position.

12. A focusing carriage for photographic enlargers having a lamp housing and a support therefor, said support comprising a rotatable and tiltable plate, a bracket table secured to said plate and having a lug and a latch post, a lens carrier below said support, said lamp housing and bracket adapted to receive a negative holder between them and to be rotated and tilted in unison with said plate and independently of said lens carrier, lever mechanism pivotally connected to said lug and said lamp housing for raising and lowering said housing with respect to said bracket table, and a handle extending from said lever mechanism to engage said latch post when said lamp housing is in a raised position and to maintain it therein.

13. In combination with a lamp housing for a focusing carriage of photographic enlargers comprising a base and top, and a source of light supported therein and adapted to project light through an opening in the bottom of said base, a support plate having a lug and a latch post, a pair of levers pivotally connected to said lug with their one ends and to said base with their other ends, said levers adapted to raise and lower said lamp housing with respect to said support plate, and an extension to one of said levers adapted to engage said latch post when said lamp housing is in a raised position and maintain it therein.

14. A focusing carriage for photographic enlargers having a lamp housing and a support therefor, said support comprising a rotatable and tiltable plate, a bracket table secured to said plate and having a lug and a latch post, a lens carrier below said support, said lamp housing and bracket table adapted to receive a negative holder between them and to be rotated and tilted in unison with said plate and independently of said lens carrier, a pair of levers pivotally connected to said lug with their one ends and to said lamp housing with their other ends, said levers adapted to raise and lower said lamp housing with respect to said support, and an extension to one of said levers adapted to engage said latch post when said lamp housing is in a raised position and maintain it therein.

15. In a photographic enlarger, a main support and a movable carriage thereupon comprising a pair of frame members, a support plate bearing a rotatable insert, and downwardly extending legs tiltably disposed adjacent said frame members, means to lock said legs to said frame members in selected tilted positions, a lens carrier below said support plate adjustably fastened to said carriage, a bracket table removably secured to said rotatable insert, and a lamp housing supported upon said bracket table, said lamp housing and bracket table adapted to receive a negative holder between them and to be rotated and tilted in unison with said rotatable insert and independently of said lens carrier.

16. In a photographic enlarger, a main support and a movable carriage thereupon, a rotatable apertured plate mounted upon said carriage, means for tilting said plate and means for maintaining said plate in selected tilted positions, a focusing rod slidably guided within the carriage, a transversely disposed shaft in frictional contact with said focusing rod, a lens carrier below said plate fixedly secured to said focusing rod, a lamp housing supported by said plate, a negative holder between said housing and plate, said plate, negative holder and lamp housing adapted to be rotated and tilted in unison and independently of said lens carrier, means to raise and lower said lamp housing with respect to said plate, and means to maintain said housing in raised position.

17. In a photographic enlarger, a main support and a movable carriage thereupon comprising a pair of frame members, a support plate having a rotatable insert and downwardly extending legs tiltably disposed adjacent said frame members, means to lock said legs to said frame members in selected tilted positions, a focusing rod slidably supported between said frame members, a transversely disposed shaft journaled within said frame members and in frictional contact with said focusing rod, a lens carrier below said plate fixedly secured to said focusing rod, a bracket table removably secured to said rotatable insert, and a lamp housing supported upon said bracket table, said lamp housing and bracket table adapted to receive a negative holder between them and to be rotated and tilted in unison with said rotatable insert and independently of said lens carrier.

RUDOLPH SIMMON.